US008494145B2

(12) United States Patent
Spear

(10) Patent No.: US 8,494,145 B2
(45) Date of Patent: Jul. 23, 2013

(54) METHOD AND SYSTEM FOR MANAGING A CALL REQUEST IN A NETWORK

(75) Inventor: Stephen L. Spear, Skokie, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1114 days.

(21) Appl. No.: 11/859,807

(22) Filed: Sep. 24, 2007

(65) Prior Publication Data

US 2008/0144797 A1    Jun. 19, 2008

Related U.S. Application Data

(60) Provisional application No. 60/869,914, filed on Dec. 14, 2006.

(51) Int. Cl.
*H04M 3/42* (2006.01)
(52) U.S. Cl.
USPC ..................................... 379/211.01; 455/417
(58) Field of Classification Search
USPC .............. 379/88.16, 46, 210.01, 209.01, 274, 379/211.01, 201.01; 455/567, 458, 401, 460, 455/414.1, 417

See application file for complete search history.

(56) References Cited

U.S. PATENT DOCUMENTS

| | | | |
|---|---|---|---|
| 6,816,469 B1 * | 11/2004 | Kung et al. | 370/260 |
| 2004/0067781 A1 | 4/2004 | Grech et al. | |
| 2004/0243712 A1 | 12/2004 | Sakai et al. | |
| 2005/0163108 A1 * | 7/2005 | Moore et al. | 370/352 |
| 2006/0009243 A1 * | 1/2006 | Dahan et al. | 455/466 |
| 2006/0245558 A1 | 11/2006 | Gatzke et al. | |

* cited by examiner

*Primary Examiner* — Antim Shah

(57) ABSTRACT

A method and system for managing a call request in a network (100) is disclosed. The network (100) includes a plurality of call servers. The method includes a call request being received (304) by a central server (120) from a call server of the plurality of call servers (114 and 116) corresponding to a request from a source terminal. The central server (120) manages the call request received from the call server. Further, the method includes determining (306) the status of the called party. Moreover, the method includes processing (308) the call request, based on the status determined for the called party.

15 Claims, 4 Drawing Sheets

METHOD AND SYSTEM FOR MANAGING A CALL REQUEST IN A NETWORK

REFERENCE(S) TO RELATED APPLICATION(S)

The present application claims priority from a provisional application, Ser. No. 60/869,914, entitled "METHOD AND SYSTEM FOR MANAGING A CALL REQUEST IN A NETWORK," filed Dec. 14, 2006, which is commonly owned and incorporated herein by reference in its entirety.

FIELD OF THE INVENTION

The present invention generally relates to communication networks, and more specifically, to a method and system for managing a call request in a communication network.

BACKGROUND OF THE INVENTION

With an increase in the need for communication and information exchange, communication networks are becoming increasingly popular. A communication network can include a plurality of communication devices and can enable communication between one or more called parties and one or more calling parties. Some examples of the communication networks include computer networks, circuit-switched networks, code division multiple access (CDMA) networks, packet-switched networks, wireless networks, and global system for mobile communication (GSM) networks. Some examples of the communication devices include personal computers, mobile phones, laptops, and personal digital assistants (PDAs). Further, the communication network can include one or more call servers. These one or more call servers may be media gateway controllers (MGCs) in a packet-switched network. The MGCs can receive signaling information from a media gateway and can instruct the media gateway to request a called party to send and receive data. Examples of the data can include audio and video content.

The one or more call servers enable a called party to register as multiple identities, which can be used by a calling party to contact the called party on a communication device. Examples of the identities of the called party can include, but are not limited to, user work on a first call server and user family on a second call server. When the called party is called at the identity user work by using the first call server, and another call is made to the called party at the identity user family by using the second call server, a call request corresponding to the second call server may not work, since the second call server is not aware that the called party is engaged with the first call server using the identity user work.

In a known technique, an intelligent network and a customized application for mobile networks enhanced logic (CAMEL) can be used. In this technique, a separate server can be connected to each call server in a packet-switched network. However, this technique may not address the problem of interaction between multiple call servers when a user receives a call from the multiple call servers.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Figure 1:
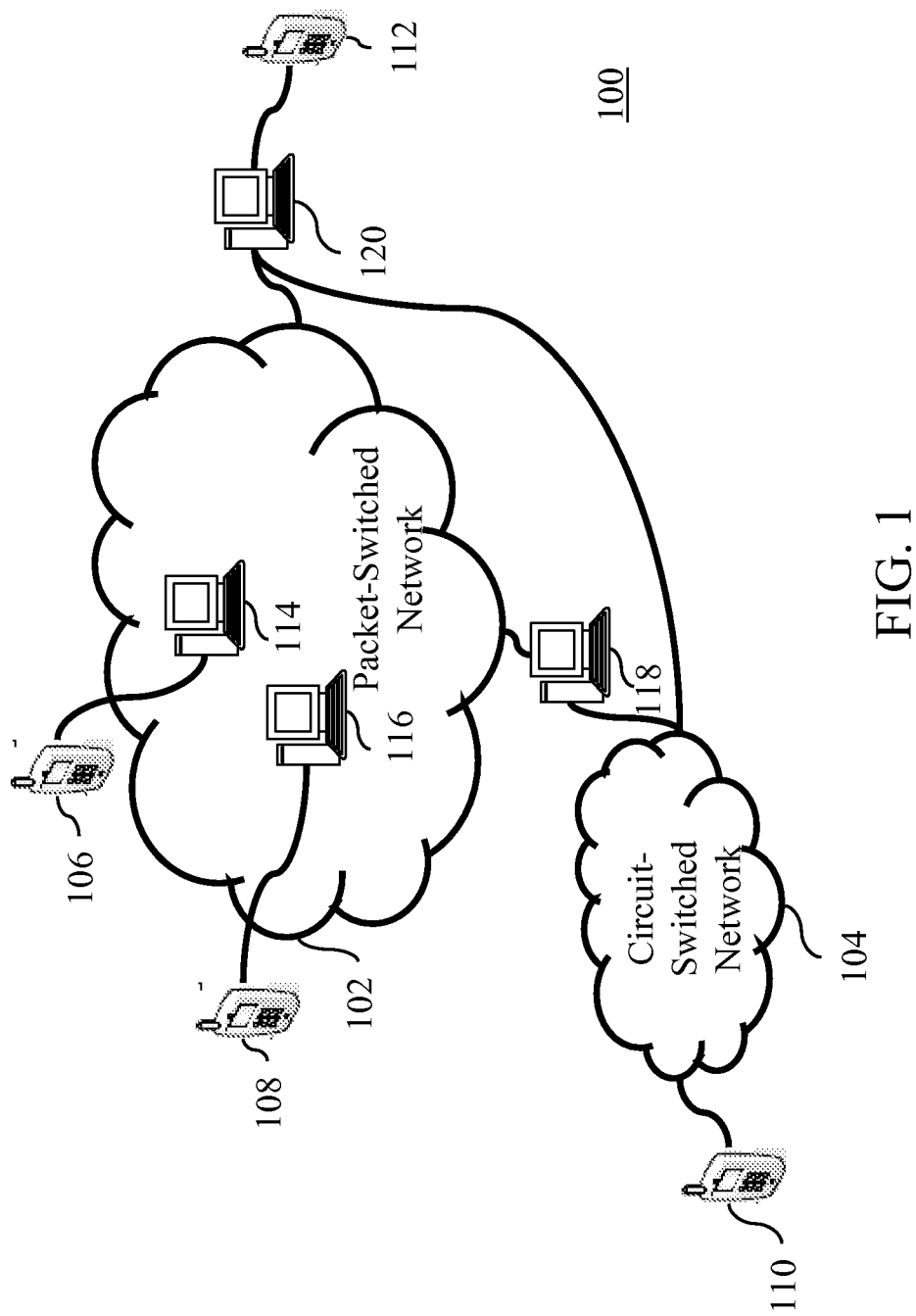
FIG. 1 illustrates an exemplary network where various embodiments of the present invention can be practiced.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of various embodiments of the present invention.

DETAILED DESCRIPTION

For one embodiment, a method for managing a call request in a network is provided. The network can include a plurality of call servers. The method includes the call request being received by a central server from a call server of the plurality of call servers corresponding to a request of a source terminal. The call request can target a called party and the central server can manage the call request received from the call server. Further, the method includes determining the status of the called party. The method also includes processing the call request, based on the status determined for the called party.

For another embodiment, a central server for managing a call request in a network is provided. The call request can be generated by a source terminal and target a called party. The central server can include a receiving module and a monitoring module. The receiving module can be adapted to receive the call request from a call server of a plurality of call servers. The monitoring module can be adapted to determine the status of the called party. Further, the central server includes a processing module, which can be adapted to process the call request, based on the status determined for the called party. Furthermore, the processing module can be communicatively coupled to at least one of the receiving module or the monitoring module.

Before describing in detail the particular method for managing a call request in a network, in accordance with various embodiments of the present invention, it should be observed that the present invention resides primarily in combinations of method steps and system components related to managing a call request in a network. Accordingly, the method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, relational terms such as first and second, and the like, may be used solely to distinguish one entity or action from another entity or action, without necessarily requiring or implying any actual such relationship or order between such entities or actions. The terms 'comprises,' 'comprising', or any other variation thereof, are intended to cover a non-exclusive inclusion, such that a process, method, article or apparatus that comprises a list of elements does not include only those elements but may include other elements not expressly listed or inherent to such a process, method, article or apparatus. An element proceeded by 'comprises . . . a' does not, without more constraints, preclude the existence of additional identical elements in the process, method, article or apparatus that comprises the element.

The term 'another,' as used in this document, is defined as at least a second or more. The term 'includes', as used herein, is defined as comprises.

FIG. 1 illustrates an exemplary network 100, where various embodiments of the present invention can be practiced. For the purpose of description, the network 100 is shown to include a packet-switched network 102 and a circuit-switched network 104. However, it is apparent to a person skilled in the art that the network 100 can include more than one circuit-switched and/or packet-switched networks. An example of the packet-switched network 102 includes, but is not limited to, an Internet-protocol (IP)-based network. Examples of network-types that network 100 may include, but is not limited to, an IEEE 802.16-based broadband wireless access network, an advanced mobile phone systems (AMPS) network, a global system for mobile communications (GSM) network, a digital cellular systems (DCS) network, a universal mobile telecommunications systems (UMTS) network, and a Code Division Multiple Access (CDMA) network. For the purpose of this description, the network 100 is shown to include a communication device 106, a communication device 108, a communication device 110, and a communication device 112. Examples of the communication devices 106, 108, 110, and 112 include, but are not limited to, cellular phones, laptop computers, personal digital assistants (PDAs), IP-enabled phones, landline phones, voice-messaging systems, audio broadcast systems, and video broadcast systems. Further the packet-switched network 102 is shown to include a plurality of call servers, for example, a call server 114 and a call server 116.

One example of a call server is a Media Gateway Controller (MGC) in a packet-switched network. Such a call server can receive information from a media gateway and can instruct the media gateway to alert a called party, for example, a called party at the communication device 112, to send and receive data. Examples of the data include, but are not limited to, audio and video data. Further, the communication network 104 can include a media gateway 118, which can act as an intermediate unit between disparate communication networks. These disparate communication networks can use different transmission and coding techniques. For example, the packet-switched network 102 and the communication network 104 are disparate communication networks.

In one embodiment, a user of the communication device 112 can register as different identities on different call servers in a packet-switched network. For example, the called party of the communication device 112 can register as user@work on the call server 114 and as user home on the call server 116. In one scenario, when the called party of the communication device 112 is busy in a communication session with the communication device 106 at the identity user work, and the communication device 108 calls the called party at the identity user home, the call server 116 cannot determine that the called party is busy at the communication device 112. The call server 116 cannot determine this since the communication device 108 is calling the communication device 112 by using the different call server 116. Examples of the communication session include, but are not limited to, a Voice over Internet Protocol (VoIP) call, an Internet session, a file download, a web-browsing session, a net-meeting session, a dispatch group session, a voice conference, and a video conference.

However, the network 100 can include a central server 120. The central server 120 can receive a call request from a call server of the plurality of call servers, for example, from the call server 116. Examples of the call request can include, but are not limited to, a request for a voice call, call waiting, call forwarding, call filtering, multi-party conferencing, no-answer transfer, voice mail, and voice mail coordination.

Figure 2:
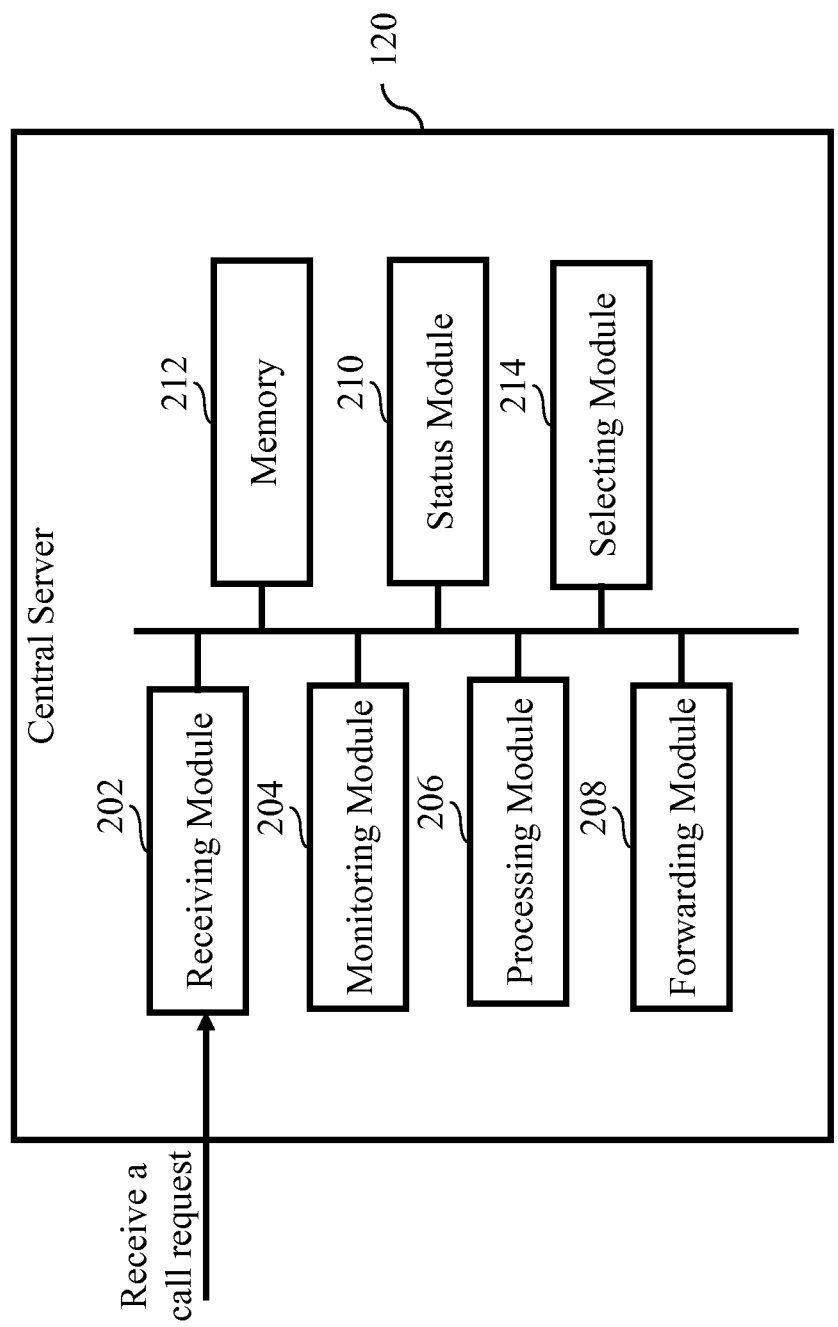
FIG. 2 illustrates a central server for managing a call request in a network, in accordance with one embodiment of the present invention.

FIG. 2 illustrates the central server 120 for managing a call request in a network, in accordance with one embodiment of the present invention. The call request can correspond to a request from a source terminal, for example, the communication device 108. The call request can be targeted to a called party at a communication device, for example, the communication device 112. The central server 120 can generate a call request, based on the request received from the source terminal.

The central server 120 includes a receiving module 202, a monitoring module 204, and a processing module 206. The receiving module 202 may be adapted to receive a call request from a call server of a plurality of call servers in the network. For example, the receiving module 202 can receive a call request from the call server 114. After receiving the call request, the monitoring module 204 can determine the status of the called party. For example, the monitoring module 204 can determine whether the called party at the communication device 112 is involved in processing related to a previous call request. On the basis of the status determined for the called party, the processing module 206 can process the call request. For one embodiment, the processing module 206 can be communicatively coupled to the receiving module 202 and the monitoring module 204. When the monitoring module 204 determines that the called party is available to be engaged in a communication associated with the call request, a forwarding module 208 of the central server 120 may forward the call request to the called party. For example, the forwarding module 208 may forward the call request of the call server 114 to the called party at the communication device 112 when the called party is available. When the called party is not available, however, the forwarding module 208 may forward the call request to a voice mail server, for example.

For one embodiment, the central server 120 may also include a status module 210. When the monitoring module 204 determines that the called party is involved in processing related to a previous call request, the status module 210 can inform either of or both the called party and the calling party about the call request.

The central server 120 may also include a memory 212 that can be adapted to store a preference of the called party. The preference of the called party can be used to select one or more destination terminals of the called party. For example, when the called party is busy in communication at the communication device 112 or when the called party is not busy in communication, the preference of the called party may guide the selection of the one or more destination terminals of the called party by the central server 120 to which the called request can be directed. The preference of the called party may indicate that the one or more destination terminals be selected based on a called party setting, a called party mode, and/or the called party location. Further, the preference of the called party may be based on either a dynamic policy or a predefined policy. Thus, in one embodiment, a selecting module 214 of the central server 120 may select a destination terminal of the one or more destination terminals for processing, associated with the called party, to process the call request.

In one embodiment, the memory 212 can be also adapted to store the preference of the called party for the selection of one or more delivery means. These delivery means are the means that may be used to deliver the call request to the one or more destination terminals of the called party. Examples of such delivery means include, but are not limited to, a circuit-switched network, a packet-switched network, an IP-based network, and a wireless network. The preference of the called party for the selection of one or more delivery means may be based on one or more of a called party setting, a called party mode, a called party location, a dynamic policy, and a predefined policy.

Figure 3:
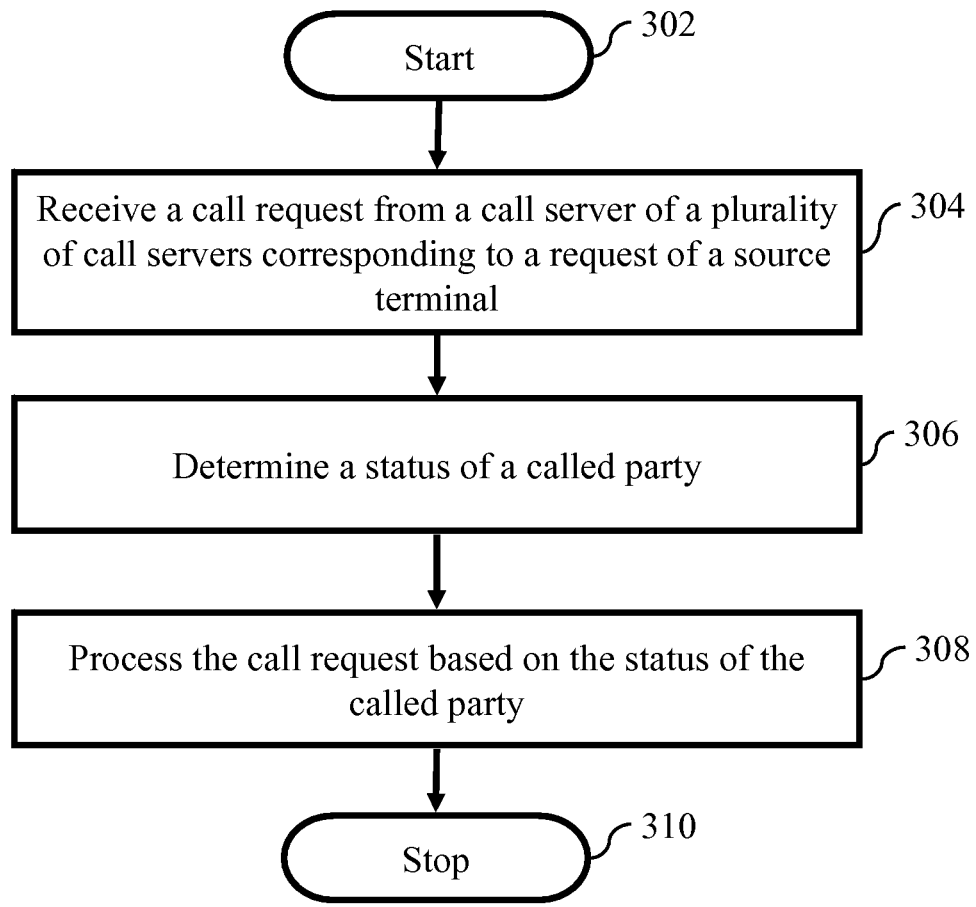
FIG. 3 is a flow diagram illustrating a method for managing a call request in a network, in accordance with one embodiment of the present invention.

FIG. 3 is a flow diagram illustrating a method for managing a call request in a network, in accordance with an embodiment of the present invention. The method for managing the call request is initiated at step 302. At step 304, the call request from a call server of the plurality of call servers is received by a central server. The call request may correspond to a request from a source terminal and be targeted to a called party. At step 306, the central server determines the status of the called party. At step 308, the call server processes the call request, based on the status determined for the called party. Examples of processing include, but are not limited to, directing the call request to the called party, directing the call request to a call server associated with the called party, and forwarding the call request to a voice mail server when the called party is involved in processing related to another call request. The method is then terminated at step 310.

Figure 4:
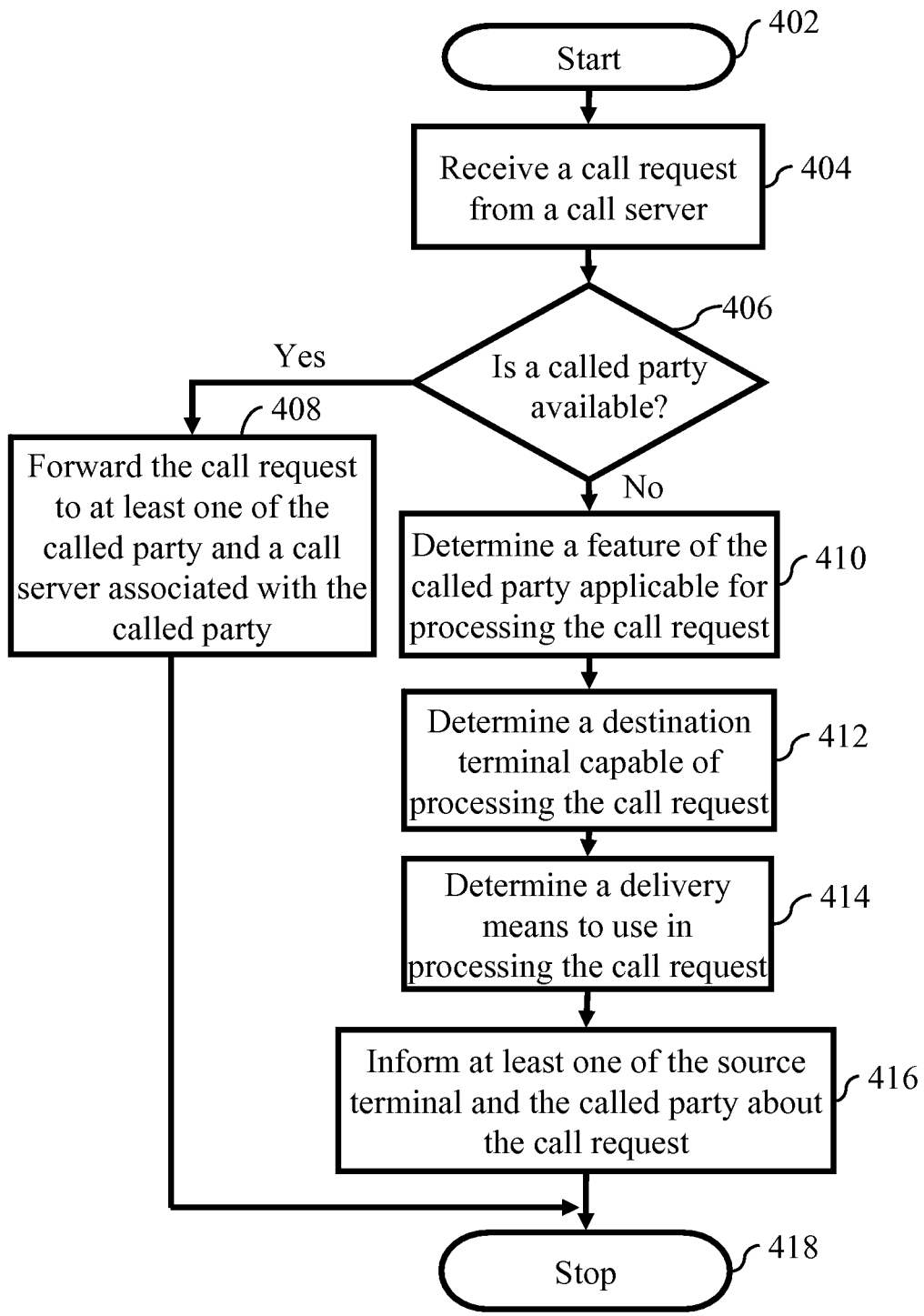
FIG. 4 is a flow diagram illustrating a method for managing a call request in a network, in accordance with another embodiment of the present invention.

FIG. 4 is a flow diagram illustrating a method for managing a call request in a network, in accordance with another embodiment of the present invention. It will be apparent to a person ordinarily skilled in the art that the method can include more or less steps than herein illustrated and described. The method for managing the call request in the network is initiated at step 402. The network can include a plurality of call servers. For example, the network 100 can include the call server 114 and the call server 116 in the packet-switched network 102. At step 404, a central server can receive a call request from a call server of the plurality of call servers. In one embodiment, the receiving module 202 of the central server 120 can receive a first call request from the call server 114. This first call request may, for example, be targeted to a called party at the communication device 112 and may correspond to a first identity of the called party on the call server 114. Subsequently, the central server 120 may receive a second call request from the call server 116, corresponding to a request from the communication device 108. The second call request may be targeted to the called party at the communication device 112 but corresponding to a second identity of the called party.

After receiving the call request, the central server can determine the status of the called party. While determining the status of the called party, the central server can determine whether the called party is available to be involved in a communication pertaining to the call request. At step 406, the central server can determine whether the called party is available to be involved in the communication pertaining to the call request. If it is determined at step 406 that the called party is available, the call request can be forwarded to the called party or a call server associated with the called party, for processing at step 408. Thus, in one embodiment, if the central server 120 determines that the called party at the communication device 112 is available, the first call request from the call server 114 can be directed to the called party at the communication device 112.

If it is determined at step 406 that the called party is not available to be involved in the communication pertaining to the call request, the one or more features of the called party applicable for processing the call request are determined at step 410. Examples of such features include, but are not limited to, an audio-processing feature and a video-processing feature. In one embodiment, the monitoring module 204 can determine the one or more features required for processing the call request.

At step 412, one or more destination terminals of the called party that are capable of processing the call request are determined. The one or more destination terminals of the called party are determined based on their availability. For example, when the called party is involved in the communication pertaining to the first call request at the communication device 112, the central server 120 may determine one or more destination terminals of the called party that are capable of processing the second call request. In one embodiment, the one or more destination terminals of the called party can be determined by the monitoring module 204. A destination terminal of the one or more destination terminals of the called party is then selected for processing the call request. The selecting module 214 may perform this selection. The destination terminal may be selected based on the features requested in the call request and/or based on preferences of the called party, which may involve a called party setting, a called party mode, the called party location, a dynamic policy and/or a predefined policy.

One or more delivery means that can process the call request are determined at step 414. These one or more delivery means include the networking and wireless technologies required to direct the call request to the called party. Examples of the one or more delivery means include, but are not limited to, a circuit-switched network, a packet-switched network, an IP-based network, and a wireless network. In one embodiment, the monitoring module 204 may determine the one or more delivery means. A delivery means may be selected from the one or more delivery means based on features requested in the call request and/or based on preferences of the called party. Such preferences of the called party may involve a called party setting, a called party mode, a called party location, a dynamic policy, and/or a predefined policy.

At step 416, the central server may inform the source terminal about the unavailability of the called party when the called party is involved in a communication associated with another call request. For example, the second call request may be targeted to the called party at the communication device 112 when the called party is involved in the communication associated with the first call request. The central server 120 may then inform the communication device 108 about the unavailability of the called party at the communication device 112. Furthermore, the central server may inform the called party about the call request. In another embodiment, the central server, while processing the call request, can forward the call request to a voice mail server when the called party is not available. The method then terminates at step 418.

Various embodiments described above provide a method and system for managing a call request in a network. The present invention does not involve the connection of separate servers to each of the call servers. Further, the method supports interaction among multiple call servers for the same user.

In the foregoing specification, the invention, as well as its benefits and advantages, have been described with reference to specific embodiments. However, one with ordinary skill in the art would appreciate that various modifications and changes can be made, without departing from the scope of the present invention, as set forth in the claims below. Accordingly, the specification and figures are to be regarded in an illustrative rather than a restrictive sense. All such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application and all equivalents of those claims, as issued.

What is claimed is:

1. A method for managing call requests in a network, the network comprising a plurality of call servers, the method comprising:
    receiving by a central server a first call request from a first call server of the plurality of call servers wherein the first call request corresponding to a first identity of a called party at a communication device, wherein the first call request is for initiating a first call session with the called party at the communication device;
    receiving by the central server a second call request from a second call server of the plurality of call servers wherein the second call request corresponding to a second identity of the called party at the communication device, wherein the first call request and the second call request target the called party at the communication device, and wherein the central server manages the first call request and the second call request received from the first call server and the second call server, wherein the second call request is for initiating a second call session with the called party at the communication device;
    determining a status of the called party; and
    processing the second call request based on the status determined for the called party wherein processing the second call request comprises selecting for use a destination terminal associated with the called party to process the second call request and selecting for use a delivery means that can be used to process the second call request wherein the delivery means is selected based on a feature requested in the second call request and preferences of the called party.

2. The method as recited in claim 1, wherein determining the status of the called party further comprises determining at least one of:
    whether the called party is available to be involved in a communication associated with the second call request,
    which of at least one feature of the called party is applicable for processing the second call request,
    which of at least one destination terminal is capable of processing the second call request, and which of at least one delivery means is capable of processing the second call request.

3. The method as recited in claim 1, wherein the destination terminal is selected based on a feature requested in the second call request and preferences of the called party.

4. The method as recited in claim 3, wherein the preferences of the called party are based on at least one of a called party setting, a called party mode, a called party location, a dynamic policy and a predefined policy.

5. The method as recited in claim 1, wherein the delivery means is at least one of a circuit-switched network, a packet-switched network, an internet protocol-based network, and a wireless network.

6. The method as recited in claim 1, wherein the preferences of the called party are based on at least one of a called party setting, a called party mode, a called party location, a dynamic policy and a predefined policy.

7. The method as recited in claim 1, wherein processing the second call request further comprises forwarding the second call request to at least one of the called party and a call server associated with the called party, when the called party is available to be involved in a communication associated with the second call request.

8. The method as recited in claim 1, wherein processing the second call request further comprises informing at least one of a source terminal and the called party about the second call request, when the called party is involved in a communication associated with the first call request.

9. The method as recited in claim 1, wherein processing the second call request further comprises forwarding the second call request to a voice mail server when the called party is not available.

10. The method as recited in claim 1, wherein the second call request comprises at least one of a request for a voice call, call waiting, call forwarding, call filtering, multi-party conferencing, a no-answer transfer, voice mail, and voice mail coordination.

11. A central server for managing call requests in a network, the call requests being generated by a plurality of source terminals and targeting a called party, the central server comprising:
    a receiving module, the receiving module adapted to receive a first call request from a first call server of a plurality of call servers, wherein the first call request corresponds to a first identity of the called party at a communication device, wherein the first call request is for initiating a first call session with the called party at the communication device, the receiving module further adapted to receive a second call request from a second call server of a plurality of call servers, wherein the second call request corresponds to a second identity of the called party at the communication device, wherein the second call request is for initiating a second call session with the called party at the communication device;
    a monitoring module, the monitoring module adapted to determine a status of the called party;
    a processing module, the processing module adapted to process the second call request based on the status determined for the called party, wherein the processing module is communicatively coupled to at least one of the receiving module and the monitoring module; and
    a selecting module, wherein the selecting module is adapted to select at least one destination terminal to process the second call request, wherein the at least one destination terminal is selected based on at least one of features requested in the second call request and a preference of the called party.

12. The central server as recited in claim 11 further comprising a memory, wherein the memory is adapted to store the preference of the called party for selection of the at least one destination terminal, wherein the preference of the called party is based on at least one of called party settings, a called party mode, a called party location, a dynamic policy, and a predefined policy.

13. The central server as recited in claim 12, wherein the memory is further adapted to store a preference of the called party for selection of at least one delivery means, wherein the preference of the called party is based on at least one of the called party settings, the called party mode, the called party location, the dynamic policy, and the predefined policy.

14. The central server as recited in claim 11 further comprising a forwarding module, wherein the forwarding module is adapted to forward the second call request to at least one of:

the called party and a call server associated with the called party when the called party is available to be involved in a communication associated with the second call request, and a voice mail server when the called party is not available.

15. The central server as recited in claim 11 further comprising a status module, wherein the status module is adapted to inform at least one of a calling party and the called party when the called party is involved in processing related to a previous call request.

* * * * *